(12) United States Patent
Yajima et al.

(10) Patent No.: US 6,357,263 B1
(45) Date of Patent: Mar. 19, 2002

(54) METHOD FOR BENDING A GLASS SHEET, A RING MOLD FOR BENDING A GLASS SHEET, AND APPARATUS USING THE RING MOLD

(75) Inventors: Toshimi Yajima; Masahiro Tsuchiya, both of Aichi; Hiroshi Yamakawa; Masahiko Kobayashi, both of Kanagawa; Katsuki Saito, Aichi, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/356,352

(22) Filed: Jul. 19, 1999

Related U.S. Application Data

(63) Continuation of application No. PCT/JP98/05224, filed on Nov. 19, 1998.

(30) Foreign Application Priority Data

Nov. 19, 1997 (JP) .............................................. 9-335143

(51) Int. Cl.[7] ......................................... C03B 23/027
(52) U.S. Cl. .................. 65/102; 65/90; 65/93; 65/94; 65/106; 65/107; 65/285; 65/287; 65/290; 65/291
(58) Field of Search ............................... 65/90, 93, 94, 65/102, 106, 107, 285, 287, 290, 291

(56) References Cited

U.S. PATENT DOCUMENTS

| 2,695,476 A | * | 11/1954 | Jendrisak | ...................... 65/290 |
| 2,774,189 A | * | 12/1956 | Jendrisak | ...................... 65/290 |
| 2,859,561 A | * | 11/1958 | Jendrisak | ...................... 65/290 |
| 4,687,501 A | * | 8/1987 | Reese | ........................... 65/106 |

FOREIGN PATENT DOCUMENTS

| AU | 209314 | * | 2/1957 | .................. 65/291 |
| FR | 1227869 | * | 8/1960 | .................. 65/291 |
| JP | 38-5140 | | 4/1963 | |
| JP | 63-156025 | | 6/1988 | |
| JP | 8-183625 | | 7/1996 | |

* cited by examiner

*Primary Examiner*—Michael Colaianni
(74) *Attorney, Agent, or Firm*—Oblon, Spivak, McClelland, Maier & Neustadt, P.C.

(57) ABSTRACT

In bending a glass sheet, the load applied to an intermediate glass sheet can be equalized to improve the quality of a final glass sheet. For this purpose, a forming ring 1 comprises a first forming frame 15 and a second forming frame 16, and the swingable center of each of swingable frames 19, 20, which forms right and left portions of a second forming frame 16, is located at an intermediate position apart from a separation position from each of fixed frames 17, 18. By such arrangement, the intermediate glass sheet can be equally supported when the swingable frames 19, 20 are moved along the intermediate glass sheet and the intermediate glass sheet is transferred from the first forming frame 15 onto the second forming frame 16.

16 Claims, 6 Drawing Sheets

METHOD FOR BENDING A GLASS SHEET, A RING MOLD FOR BENDING A GLASS SHEET, AND APPARATUS USING THE RING MOLD

This application is a Continuation of application Serial No. PCT/JP98/05224 Filed on Nov. 19, 1998

BACKGROUND OF THE INVENTION

1. Technical Field

The present invention relates to a method for bending a glass sheet, a ring mold for bending a glass sheet and an apparatus using the ring mold. In particular, the present invention relates to a method for bending a glass sheet to be used for a windshield and a rear window of an automobile and so on, a ring mold for bending such a glass sheet, and an apparatus using the ring mold.

2. Background Art

In general, a glass sheet for a windshield, rear window and the like of an automobile is required to be formed in a bent shape in terms of design in automobiles. The windshield and the rear glass are ones that are obtained by bending a flat glass sheet cut in a certain shape (hereinbelow, referred to as "the or an unformed glass sheet").

Now, a forming ring mold in an apparatus for bending a glass sheet will be explained. The ring mold is bent so as to be substantially matched with the outline of a final shape (product shape) of a bent glass sheet. The unformed glass sheet has periphery portions thereof supported by the ring mold, and the ring mold with the unformed glass sheet supported thereon is carried into a heating furnace. As a result, the unformed glass sheet is heated to a bending temperature, sags downwardly by its own weight to have the periphery portions bent along the ring mold, and is bent into a certain shape.

An example of the ring mold is one disclosed in JP-A-63156025. This ring mold comprises fixed frames for supporting central periphery portions of a glass sheet, and swingable frames provided adjacent to the fixed frames. The ring mold is carried into a heating furnace, supporting lateral periphery portions of the unformed glass sheet by the swingable frames. When the unformed glass sheet is heated to be soften, the swingable frames swing as the unformed glass sheet is becoming bent. Thus, the swingable frames and the fixed frames are combined to provide a framework having a certain bent shape, and the periphery portions of the unformed glass sheet sags along the framework by their own weight. A central region of the glass sheet simply sags downwardly by its own weight since the central region is not supported by the ring mold.

By the way, automobiles having a complicated bent shape have been frequently seen in recent years. For this reason, a windshield, a rear window and the like are required to have a complicated bent shape. For example, glass sheets that have a central region formed in a greatly bent shape have been increasingly demanded.

In order to bend a glass sheet in such a shape, the above-mentioned publication discloses an arrangement wherein a pressing die, which is provided above the framework, is pressed against the glass sheet. It is difficult to increase only the central region in the bend applied to the glass sheet without using the pressing die. In this purpose, the pressing die is required to be used for assisting the bend.

However, the pressing die is required to be additionally provided, making the apparatus complicated. The use of the pressing die increases the external force applied to the glass sheet, contributing to degradation in optical quality of the glass sheet, such as strain.

As a ring mold to be used for forming a glass sheet in a complicated bent shape, there is one that is disclosed in, e.g., JP-A-8183625. This ring mold includes a first forming frame and a second forming frame. The first forming frame supports the periphery portions of an unformed glass sheet, and the unformed glass sheet is bent to be formed into an intermediate glass sheet when the unformed glass sheet is heated to a bending temperature. The second forming frame has such a shape to be matched with a final shape of the glass sheet to be formed. The second forming frame supports the periphery portions of the intermediate glass sheet, and the periphery portions of the intermediate glass sheet sag along the second forming frame, providing the glass sheet with a desired bent shape.

The method to bend a glass sheet by this ring mold includes a first forming process and a second forming process. The first forming process includes the following steps. An unformed glass sheet is put on the first forming frame, the ring mold with the unformed glass sheet put thereon in such a way is carried into a heating furnace, and the unformed glass sheet is heated to a bending temperature. The unformed glass sheet has the periphery portions sagged along the first forming frame, being formed in the intermediate glass sheet. The second forming process includes the following steps subsequent to the first forming process. The intermediate glass sheet which has been formed in the first forming process is transferred onto the second forming frame. The intermediate glass sheet has the periphery portions sagged along the second forming frame, being formed in a bent shape. Thus, a complicated bent shape is provided to the glass sheet.

In the ring mold disclosed in JP-A-8113625, the movable forming frame is movable about the centerline of the ring mold. In the second forming process, the lateral portions of the movable forming frame move so as to rise up with respect to the centerline. By this movement, the glass sheet becomes opt to jump, contributing to degraded precision in the bent shape of the glass sheet or degraded optical quality due to occurrence of strain and so on. Normally, glass sheets for automobiles have a substantially rectangular shape or a trapezoid shape having short sides and long sides. When a glass sheet having such a shape is bent by its own weight, the glass sheet is easy to be bent in a long side direction and difficult to be bent in a short side direction. From this view point, it is difficult to bend a glass sheet in a sufficient way in the short side direction in the conventional method disclosed in the two publications.

A proposal has been made to increase heating to portions of a glass sheet in the short side direction in order to promote the bend in the short side direction. However, a temperature distribution is required to be finely controlled in order to heat an unformed glass sheet. The fine control of the temperature distribution needs many special heaters, creating problems in that the control is complicated and the cost increases.

It is an object of the present invention to solve the problems of the prior art stated earlier to provide a method for bending a glass sheet, a ring mold for bending a glass sheet and an apparatus using the ring mold, which have not been known.

DISCLOSURE OF THE INVENTION

In order to solve the problems, the present invention provides a method for bending a glass sheet, which comprises putting an unformed glass sheet on a ring mold to support peripheral portions of the unformed glass sheet thereon, and carrying the ring mold into a heating furnace to bend the glass sheet; and which further comprises a first forming process to heat the unformed glass to a bending temperature to bend the unformed glass sheet so as to form the unformed glass sheet into an intermediate glass sheet, and a second forming process to support the peripheral portions of the intermediate glass on a forming surface conformed with a final shape of the glass sheet to be formed and to form the intermediate glass sheet into a glass sheet having a certain bent shape along the forming surfaces; characterized in that the intermediate glass sheet is formed by bending portions of the unformed glass sheet in a short side direction in the first forming process, and the portions of the intermediate glass sheet in the short direction are further bent into a certain bent shape and portions of the intermediate glass sheet in a long side direction are bent.

The present invention also provides a ring mold for bending a glass sheet, which supports peripheral portions of an unformed glass sheet, and is carried into a heating furnace, carrying the unformed glass sheet thereon, to bend the glass sheet, and which comprises a first forming frame for bending the unformed glass sheet to form the unformed glass sheet into an intermediate glass sheet when the unformed glass sheet is heated to a bending temperature, and a second forming frame for supporting peripheral portions of the intermediate glass formed by the first forming frame on a forming surface conformed with a final shape of the glass sheet and for forming the intermediate glass sheet into the final glass sheet along the forming surface, characterized in that the second forming frame comprises fixed frames fixedly provided, and swingable frames provided on both sides of the fixed frames in a longitudinal direction and apart from the fixed frames, and that each of the swingable frames is turnable about an intermediate position as a swingable center which is located apart from a separating position with the related fixed frame.

In addition, the present invention provides an apparatus for bending a glass sheet, which comprises a heating furnace for heating an unformed glass sheet to a bending temperature, and the ring mold for bending a glass sheet to be carried into the heating furnace, supporting peripheral portions of the unformed glass sheet thereon and to sag the unformed glass sheet due to its own weight caused by softening of the glass sheet.

BEST MODE FOR CARRYING OUT THE INVENTION

Figure 1:
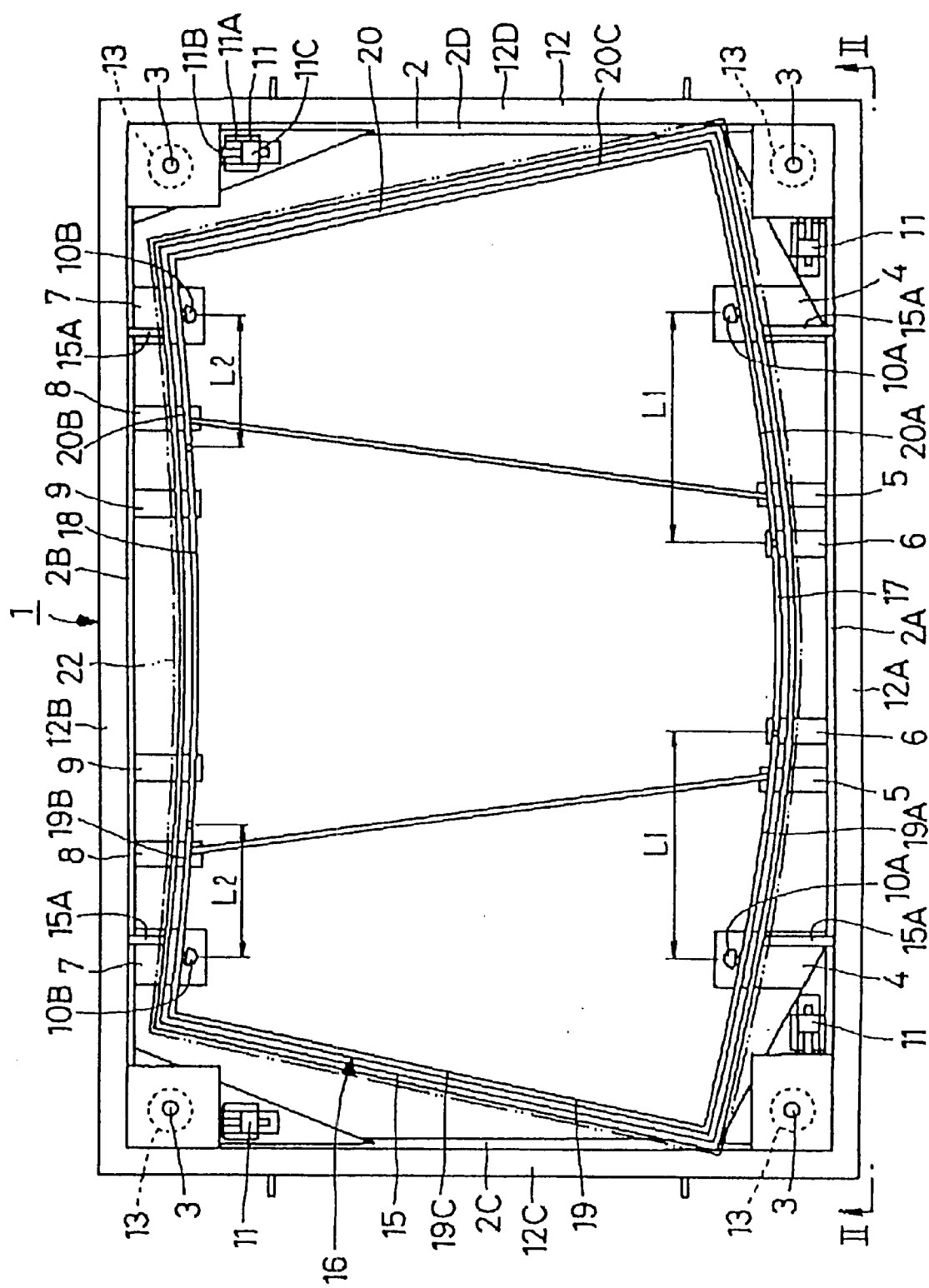
FIG. 1 is a plan view showing the ring mold according to the present invention.

Now, the apparatus for bending a glass sheet according to the present invention will be described in detail with respect to FIG. 1–FIG. 6, referring to the forming of a windshield for an automobile as an example.

A ring mold 1 comprises a base 2 explained later on, a lifter 12, a first forming frame 15, a second forming frame 16 and other members.

The base 2 is a framework in a rectangular shape, which includes a front beam 2A extending in a long side direction of a glass sheet, a rear beam 2B extending in the long side direction of the glass sheet in parallel with the beam 2A, and a left beam 2C and a right beam 2D connected to both ends of each of the front beam 2A and the rear beam 2B. When the ring mold is carried into a heating furnace, the front beam 2A lies on a front side in the carrying direction. The base 2 has guide shafts 3 provided at four corners thereof so as to extend in a direction perpendicular to a glass sheet surface (a vertical direction). The respective guide shafts 3 guide the lifter 12 in the vertical direction through guide cylinders 13 explained later on, as showing in FIG. 2.

The front beam 2A has portions close to ends provided with a pair of supports 4, 4 for supporting swingable frames 19, 20 explained later on. The front beam 2A has portions inner to the supports 4 provided with stoppers 5, 5 and supports 6, 6 for supporting a front fixed frame 17 explained later on, legs 19D, 20D of the swingable frames 19, 20 contacting the stoppers 5, 5. The respective supports 6 lie inside the respective stoppers 5. Likewise, the rear beam 2B is provided with supports 7, 7 for supporting the swingable frames 19, 20, stoppers 8, 8 for contacting the swingable frames 19, 20, and supports 9, 9 for supporting a rear fixed frame 18.

The supports 4, 4 have ball joints 10A, 10A uprighted thereon so as to swingablly support front sides of the swingable frames 19, 20. The supports 7, 7 have ball joints 10B, 10B uprighted thereon so as to swingablly supports rear sides of the swingable frames 19, 20.

Holders 11 are lifter holding devices, which are provided in the vicinity of the respective guide shafts 3 of the base 2. Main elements of each of the holders 11 are an angular post 11A extending in the vertical direction, a swingable member 11B pinned to an upper portion of the angular post 11A so as to be swingable, and a stopper plate 11C fixed on an upper surface of the angular post 11A for restricting the swingable position of the swingable member 11B at a horizontal position. The swingable member 11B is pinned at a position offset toward its leading edge.

Figure 2:
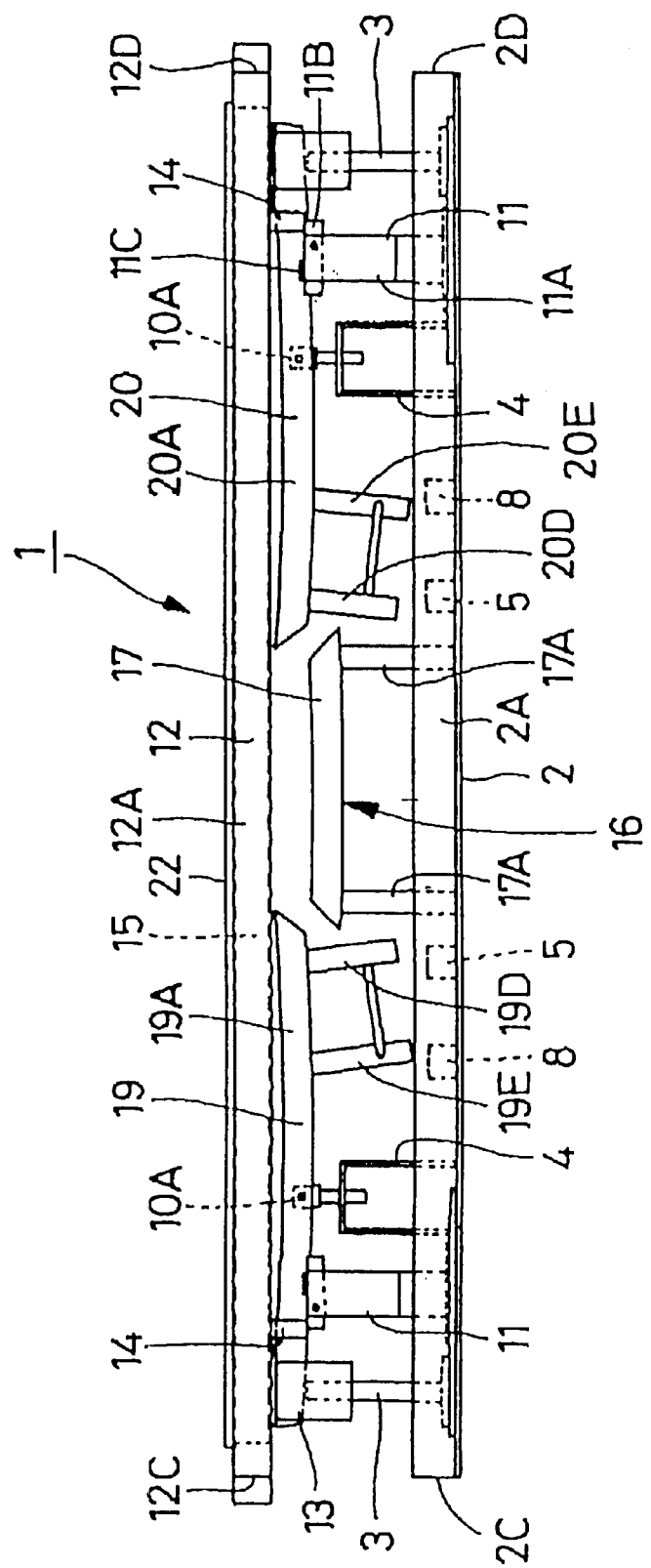
FIG. 2 is a side view as viewed in an arrowed direction indicated by II—II in FIG. 1, showing a state wherein an unformed glass sheet is put on a first forming frame in the present invention.
Figure 3:
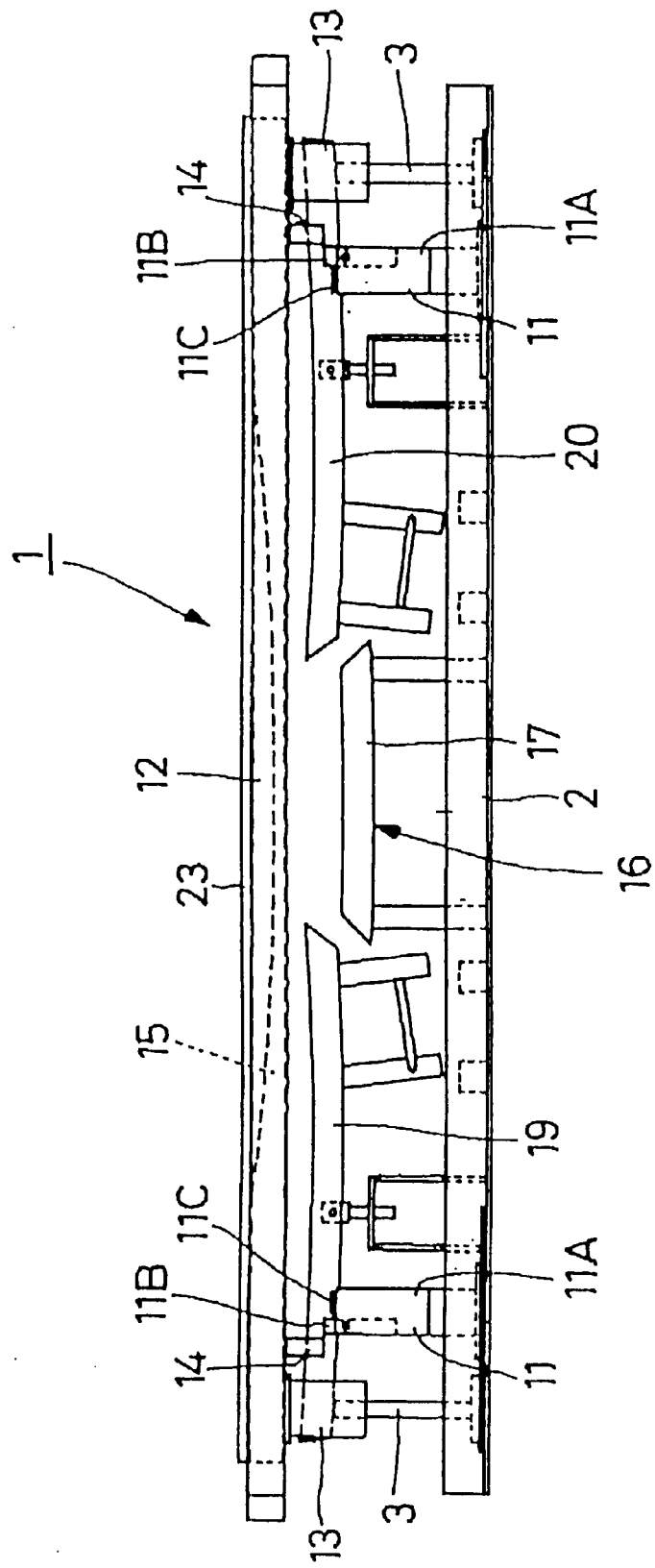
FIG. 3 is a side view as viewed in the arrowed direction indicated by II—II in FIG. 1, showing a state wherein a first forming frame is lifted in the present invention.

By such arrangement, the respective holders 11 hold the lifter 12 on the leading edge side thereof to locate the lifter 12 at a lifted position when the swingable members 11B are in a horizontal state (FIG. 2). The lifter 12 is further raised, the leading edges of the swingable members 11B disengage from supporting projections 14 explained later on, and base end portions of the swingable members 11B are downwardly turned to direct the swingable members 11B vertically (FIG. 3). Thus, the lifter 12 is allowed to lower as shown in FIGS. 4 and 5.

The lifter 12, which is provided on the base 2 so as to be liftable, is configured as a rectangular framework which includes a front beam 12A, a rear beam 12B, a left beam 12C and a right beam 12D in a substantially same way as the base 2 as a whole. The lifter 12 has four corners provided with the guide cylinders 13 for passing the shafts 3 therethrough. The lifter 12 has the supporting projections 14 (only two supported projections shown) provided thereon to contact the leading edges of the swingable members 11B when the swingable members 11B of the holders 11 are in the horizontal state.

The first forming frame 15 is provided inside the lifter 12. The first forming frame 15 is formed in a flat sector-like shape to conform with the peripheral shape of an unformed glass sheet 22 (explained later on) as shown in FIG. 1. The first forming frame 15 is fixed to the lifter 12 by coupling shafts 15A so as to be lifted and lowered along with the lifter 12.

Figure 4:
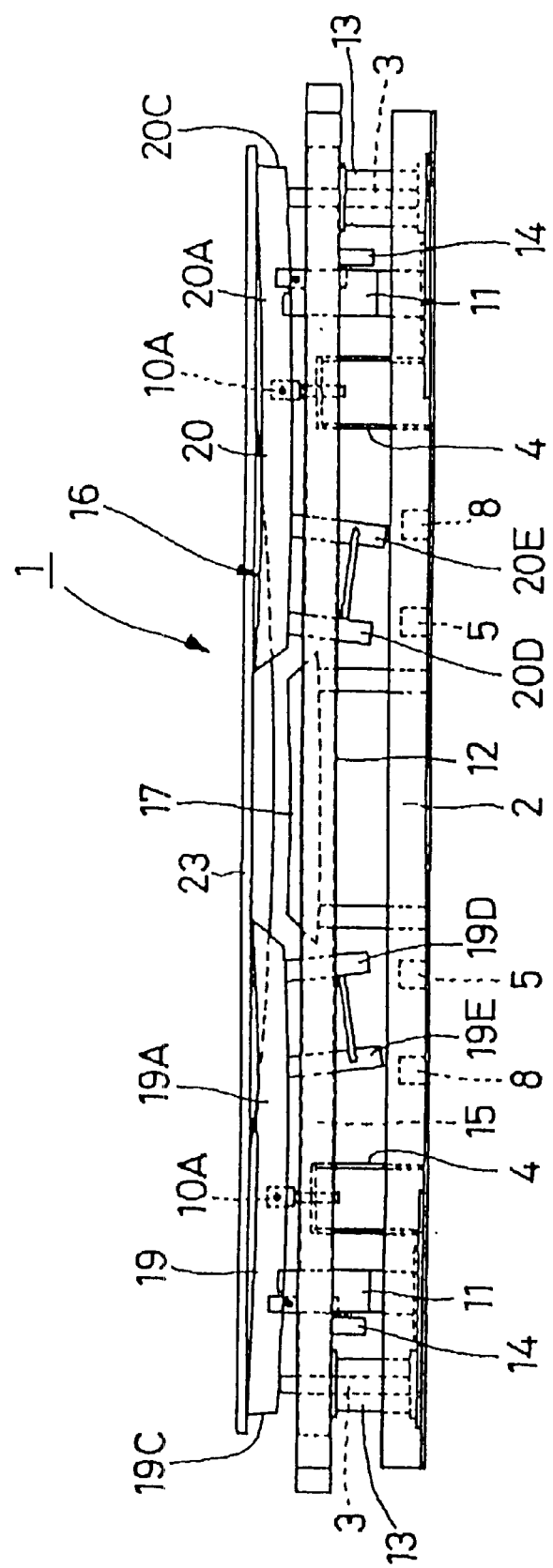
FIG. 4 is a side view as viewed in the arrowed direction indicated by II—II in FIG. 1, showing a state wherein the first forming frame is lowered and an intermediate glass sheet is transferred onto a second forming frame in the present invention.
Figure 5:
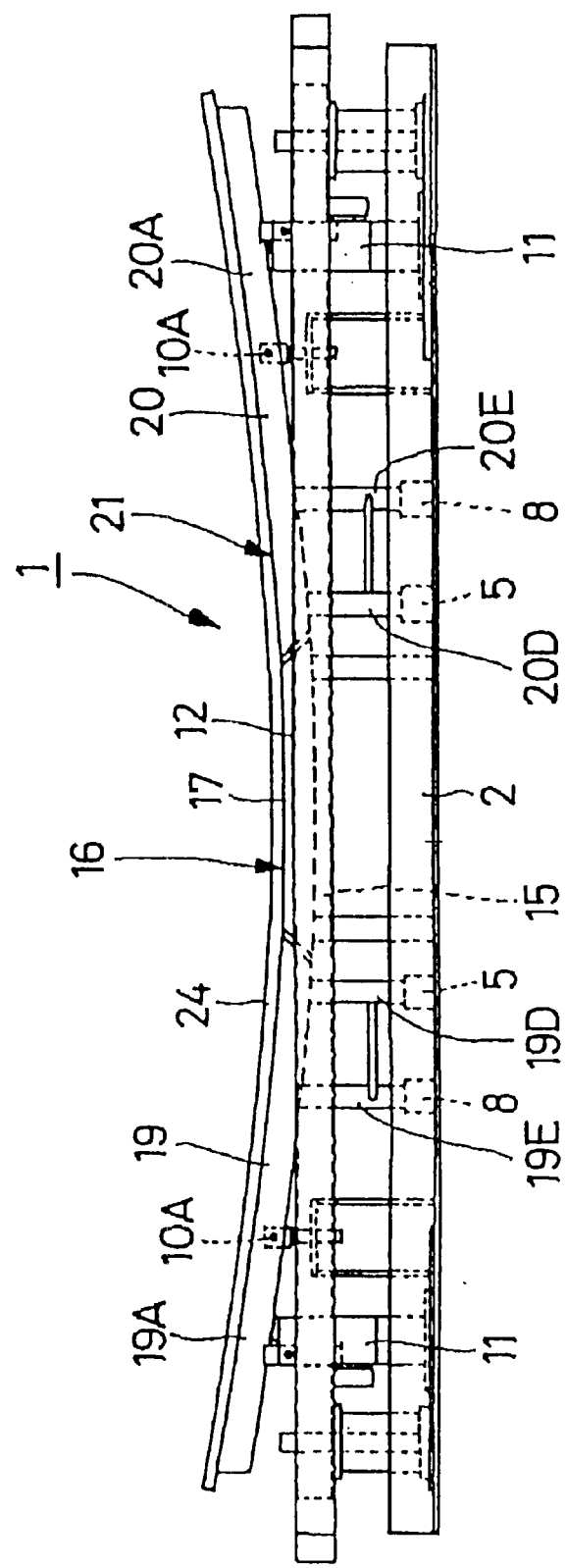
FIG. 5 is a side view as viewed in the arrowed direction indicated by II—II in FIG. 1, showing a state wherein a final glass sheet is formed by the second forming frame in the present invention.

Since the first forming frame 15 supports the periphery portions of the unformed glass sheet 22, the first forming frame allows the unformed glass sheet 22 to have a central region sagged and bent by its own weight when the unformed glass sheet is heated to a glass sheet bending temperature, and the first forming frame forms the unformed glass sheet 22 into an intermediate glass sheet 23 having a shape between a flat shape and a final shape (the shape shown in FIGS. 3 and 4).

The second forming frame 16 is provided inside the base 2. The second forming frame 16 is constituted by four members of the front fixed frame 17 explained later on, the rear fixed frame 18, the left swingable frame 19 and the right swingable frame 20. The second forming frame is formed in a sector-like shape of a size smaller than the first forming frame 15 as a whole.

The front fixed frame 17 is fixed, through legs 17A, 17A to the supports 6, 6 provided on the front beam 2A of the base 2. The front fixed frame 17 is gently curved so as to provide a upward concave shape.

The rear fixed frame 18 is fixed, through legs (not shown), to the supports 9, 9 provided on the rear beam 2B of the base 2. The rear fixed frame 18 is gently curved so as to provide a upward concave shape.

The left swingable frame 19 is provided on the left-hand side of the front fixed frame 17 and the rear fixed frame 18, being separated from both fixed frames. The left swingable frame 19 comprises a front frame section 19A, a rear frame section 19B and a left frame section 19C. The front frame section 19A is gently curved so as to be continuous with the curved shape of the front fixed frame 17. The rear frame section 19B is gently curved so as to be continuous with the curved shape of the rear fixed frame 18. The left frame section 19C is gently curved so as to provide a upward concave shape and extend in the front and rear direction so as to connect between the front frame section 19A and the rear frame section 19B. Thus, the left swingable frame 19 is formed in a substantially angular C letter shape as a whole.

The front frame section 19A and the rear frame section 19B are coupled to the ball joints 10A, 10B provided on the supports 4, 7, respectively. The coupling position of the front ball joint 10A is located at an intermediate position that is apart from the separating position with the front fixed frame 17 by a distance L1. The coupling position of the rear ball joint 10B is located at an intermediate position that is apart from the separating position with the rear fixed frame 18 by a distance L2. Thus, the left swingable frame 19 is swingable about the coupling position of the ball joints 10A, 10B as seesaw.

The front frame section 19A has a portion close to the front fixed frame 17 provided with the leg 19D. The leg 19D contacts the stopper 5 provided on the front beam 2A of the base 2. The rear frame section 19B has a portion close to the rear fixed frame 18 provided with a leg 19E. The leg 19E contacts the stopper 8 provided on the rear beam 2B of the base 2. With the front leg 19D contacting the stopper 5 and the rear leg 19E contacting the stopper 8, the front frame section 19A is located at such a position to be continuous with the front fixed frame 17 and the rear frame section 19B is located at such a position to be continuous with the rear fixed frame 18.

The right swingable frame 20 is provided on the right-hand side of the front fixed frame 17 and the rear fixed frame 18, being separated from both fixed frames. The right swingable frame 20 comprises a front frame section 20A, a rear frame section 20B and a right frame section 20C so as to be formed in a substantially angular C letter shape as a whole substantially as in the left swingable frame 19 already stated.

The front frame section 20A and the rear frame section 20B are coupled to the ball joints 10A, 10B provided on the supports 4, 7, respectively. The coupling position of the front ball joint 10A is located at an intermediate position that is apart from the separating position with the front fixed frame 17 by a distance L1. The coupling position of the rear ball joint 10B is located at an intermediate position that is apart from the separating position with the rear fixed frame 18 by a distance L2. Thus, the left swingable frame 20 is swingable about the coupling positions of the ball joints 10A, 10B as seesaw.

The front frame section 20A has a portion close to the front fixed frame 17 provided with the leg 20D. The leg 20D contacts the stopper 5 provided on the front beam 2A of the base 2. The rear frame section 20B has a portion close to the rear fixed frame 18 provided with the leg 20E. The leg 20E contacts the stopper 8 provided on the rear beam 2B of the base 2. With the front leg 20D contacting the stopper 5 and the rear leg 20E contacting the stopper 8, the front frame section 20A is located at such a position to be continuous with the front fixed frame 17 and the rear frame section 20D is located at such a position to be continuous with the rear fixed frame 18.

When the front fixed frame 17, the rear fixed frame 18, the left swingable frame 19 and the right swingable frame 20 of the second forming frame 16 are put in continuous fashion, upper surfaces of the front fixed frame, the rear fixed frame, the left swingable frame and the right swingable frame provide a forming surface 21 that substantially conforms with the periphery portions of a final glass sheet 24.

When a ring mold is used to bend a glass sheet so as to obtain a windshield, an annealing process is usually added after bending the glass sheet by heating. Even in the annealing process, a glass sheet is subjected to slight sag if the glass sheet is still at a high temperature. On the other hand, the bent shape of a glass sheet is slightly modified by shrinkage of the glass sheet due to cooling in some cases. In consideration of such circumstances, the forming surface provided by the second forming frame is slightly different from the bent shape of a glass sheet to be finally obtained in some cases. The reason why the word "substantially" has been used is that the circumstances have been taken into account. In consideration of the circumstances, the expression "final glass sheet" in the present invention is used without differentiating a glass sheet having a shape immediately before the annealing process from a glass sheet formed in a desired bent shape to be finally obtained.

When an intermediate glass sheet 23 is put on the second forming frame 16, the swingable frames 19, 20 can be moved along the intermediate glass sheet 23 to stably support the intermediate glass sheet 23 at leading edges of the front frame sections 19A, 20A and the rear frame sections 19B, 20B, and at the right and left frame sections 19C, 20C (FIG. 4).

When the intermediate glass sheet 23 sags by its own weight to increase the amount of bend, the frame sections 19A, 19B, 20A, 20B have the portions close to the fixed frames 17, 18 automatically lowered, depending on an increase in the amount of bend. Finally, the frame sections 19A, 19B, 20A, 20B have the portions close to the fixed frames 17, 18 located at the positions to be continuous with the fixed frames 17, 18. The forming surface 21 provided at that time forms a final glass sheet 24 (FIG. 5).

Figure 6:
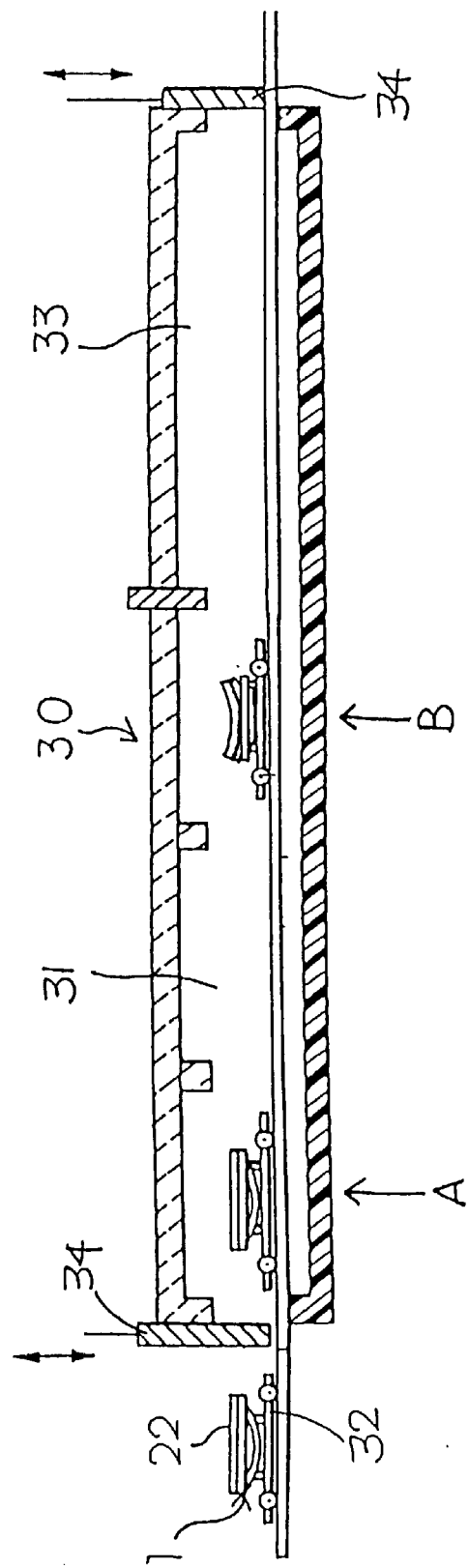
FIG. 6 is a schematic cross-sectional view showing an example of the entire structure of an apparatus for bending a glass sheet according to the present invention.

Now, a method to employ the ring mold to bend a glass sheet will be explained. As shown in FIG. 6, the unformed glass sheet 22 is put on the ring mold 1, which has been provided on a proper carrying device, such as a carriage 32. When the ring mold 1 is carried into a heating furnace 30, the glass sheet is heated to have the peripheral portions thereof bent so as to conform with the shapes of the portions of the ring mold 1 that support the glass sheet. To sum up, a first forming process is carried out in an A zone and a second forming process is carried out in a B zone. Reference numeral 31 designates a heating zone, reference numeral 33 designates an annealing zone, and reference numeral 34 designates doors which isolate the inside and the outside of the heating furnace 30 and are opened and closed for carrying the ring mold 1 into and out of the heating furnace. Since FIG. 6 is a schematic view to show the outline of the entire apparatus, the ring mold 1 is schematically shown. Now, detailed explanation will be given.

First, the swingable members 11B of the lifter holding devices 11 are put into the horizontal state for preparation as shown in FIG. 2. The lifter 12 is put on the swingable members 11B through the supporting projections 14 to be located at the lifted position along with the first forming frame 15. In this state, the first forming frame 15 is arranged at a higher position than the second forming frame 16.

Next, the unformed glass sheet 22, which has been cut in a sector-like shape so as to have the peripheral shape conformed with the first forming frame 15, is put on the first forming frame 15. The unformed glass sheet 22 as well as the base is carried into the heating furnace, and the unformed glass sheet 22 is heated to the bending temperature. Thus, the unformed glass sheet 22 is softened and bent so as to have a central region sagged by its own weight as shown in FIG. 3, becoming the intermediate glass sheet 23. This is the first forming process.

Next, the second forming process will be explained. In the second forming process, the intermediate glass sheet 23, which has been obtained in the first forming process, is first transferred onto the second forming frame 16. In this case, the lifter 12 is moved upward with respect to the base 2 to turn the swingable members 11B of the lifter holding devices 11 vertically as shown in FIG. 3. As shown in FIG. 4, the lifter 12 is downwardly moved to be located at a lowered position, and the first forming frame 15 is lowered to a lower position than the second forming frame 16. Thus, the intermediate glass sheet 23 can be transferred from the first forming frame 15 onto the second forming frame 16.

When the intermediate glass sheet 23 is transferred from the first forming frame 15 onto the second forming frame 16, the intermediate glass sheet 23 is first supported by the right and left swingable frames 19, 20. After that, the right and left swingable frames 19, 20 are turned by the weight of the intermediate glass sheet 23 to support the intermediate glass 23 so that the swingable frames 19, 20 extend along the intermediate glass sheet 23. Thus, the intermediate glass sheet 23 can have the load thereof equally received when the softened intermediate glass sheet 23 is put on the second forming frame 16.

Next, the intermediate glass sheet 23 which has been transferred onto the second forming frame 16 is bent by its own weight so as to further sag. At that time, the swingable frames 19, 20 automatically turn, depending on the amount of bend of the intermediate glass sheet 23, until the legs 19D, 20D contact the stoppers 5, 8 provided on the base 2. With the legs 19D, 20D contacting the stoppers 5, 8, the forming surface 21 is provided by the second forming frame 16. Thus, the intermediate glass sheet 23 is formed into the final glass sheet 24, being bent along the forming surface 21.

The final glass sheet 24 thus formed may be attached to an automobile body so as to be used as e.g. a windshield of the automobile.

In accordance with this mode, the intermediate glass sheet 23 can have the load thereof substantially equally received by the swingable frames 19, 20 of the second forming frame 16 when the intermediate glass sheet 23 is transferred from the first forming frame 15 onto the second forming frame 16. As a result, the final glass sheet 24 can be formed so as to have a symmetrical shape, and the occurrence of, e.g., strain can be restrained to improve the optical quality of the glass sheet. Thus, the reliability to the ring mold 1 can be improved.

By using the first forming frame 15 to form the intermediate glass sheet 23 and using the second forming frame 16 to form the final glass sheet 24, it becomes possible to form the final glass sheet 24 so as to have a complicated shape without providing many special heaters to finely control the temperature distribution of a glass 10 sheet as in the prior art. Thus, the temperature control can be simplified and the cost can be reduced.

The first forming frame 15 is provided so as to be movable along with the lifter 12 in the vertical direction. The first forming frame 15 and so on can be located at the lifted position and at the lowered position by the respective lifter holding devices 11. This arrangement can transfer the intermediate glass sheet 23 from the first forming frame 15 onto the second forming frame 16 with the simplified structure and operation.

The present invention is not limited to the mode stated above. For example, the explanation of the mode has been made with respect to a case wherein a single unformed glass sheet 22 is heated and bent. As another mode, two unformed glass sheets for laminated glass may be put one on the other on the ring mold 1 and be simultaneously bent together. In the mode stated earlier, the first forming frame 15 is formed in a flat sector-like shape. In lieu of such a flat sector-like shape, the first forming frame 15 may be formed in such a sector-like shape that the first forming frame is curved so as to have gentler curved surfaces than the second forming frame 16. In particular, it is preferable that the first forming frame 15 has the short sides curved so as to provide a upward concave shape. This shape causes an unformed glass sheet to be bent in the short side direction in the first forming process (the axis of the bend extends in the long side direction). The reason why to bend in the short side direction first is preferable is as follows. When a glass sheet which has long sides and short sides is bent by its own weight, the portions in the long side direction are bent easier than the portions in the short side direction. By providing the short sides of the first forming frame 15 with a curved shape, bending a glass sheet in the short side direction can be made more positively than bending the glass sheet in the long side direction in the forming process to successively bend glass sheets.

In a mode stated earlier, the first forming frame 15 is provided on an outer side and the second forming frame 16 is provided on an inner side. In lieu of such arrangement, the first forming frame 15 may be provided on the inner side and the second forming frame 16 may be provided on the outer side.

In the mode stated earlier, the lifter supporting devices 11 are employed to locate the lifter 12 at the lifted position and at the lowered position. As other examples, cam devices, ball threads or other devices may be employed to locate the lifter 12 at the lifted position and the lowered position.

In the mode stated earlier, the second forming frame 16 is fixed to the base 2 and the first forming frame 15 is provided so as to be movable along with the lifter 12 in the vertical direction. The present invention is not limited to such arrangement, and the first forming frame 15 may be fixed to the base 2 and the second forming frame 16 may be configured so as to be movable along with the lifter 12 in the vertical direction.

With respect to the mode stated earlier, the case wherein the final glass sheet 24 formed by the ring mold 1 is used as a windshield of an automobile has been illustrated as an example. In lieu of using the final glass sheet as the windshield, the final glass sheet may be used as the rear window of an automobile or a windowpane in a building for instance. In the latter case, the shapes of the first forming frame, the second forming frame, an unformed glass sheet and the like may be properly modified to conform with the shape of a final glass sheet so as to cope with the requirements. In the present invention, the ring mold is carried into the heating furnace to bend a glass sheet, utilizing the fact that the glass sheet sags by its own weight. When a glass sheet for the windshield for an automobile is bent, the bending method and the bending apparatus according to the present invention are appropriately applied.

INDUSTRIAL APPLICABILITY

As explained in detail, in accordance with the present invention, bending to some extent in the short side direction is carried out first in the first forming process, and then bending to provide a certain bent shape in the short side direction and bending in the long side direction can be carried out. By this method, bending a glass sheet in the short side direction, which has been difficult in terms of the structure, can be enhanced to form the glass sheet in a desired bent shape in both short side direction and long side direction. Since the degree to which a glass sheet has a central region sagged by its own weight can be increased by spending sufficient time for carrying out the first bending process, the glass sheet can be prepared so as to have the central region greatly bent.

In addition, in accordance with the present invention, an unformed glass sheet is put on the first forming frame, and the ring mold with the unformed glass sheet thereon is carried into the heating furnace to soften the unformed glass sheet, allowing the unformed glass sheet on the first forming frame to be formed into an intermediate glass sheet so as to have a central region sagged and bent by its own weight. When the intermediate glass sheet is transferred from the first forming frame onto the second forming frame, the intermediate glass sheet is equally supported by the respective swingable frames to equalize the load applied to the intermediate glass sheet. Since a swingable center of each of the swingable frames in the second forming frame is located at a position apart from the related fixed frames, a glass sheet is difficult to jump on turning the swingable frames, preventing precision in the bent shape or the optical quality, such as strain, of the glass sheet from degrading.

When the first forming frame and the second forming frame are relatively moved in the vertical direction and when the second forming frame is located at a higher position than the first forming frame, the following effects can be obtained in particular. Specifically, the intermediate glass sheet can be put on the second forming frame, and the intermediate glass sheet, which has been put on the first forming frame, can be transferred onto the second forming frame, simplifying the structure of the apparatus and reducing the cost.

When the sides of the first forming frame that support the short sides of a glass sheet is bent so as to have provide an upward concave shape in order to first bend the glass sheet to some extent in the short side direction in the first forming process, the following effects can be further obtained. Specifically, after bending of a glass sheet to some extent in the short side direction is first carried out in the first forming process, forming of the glass sheet into a certain bent shape in the short side direction and bending of the glass sheet in the long side direction can be carried out in the second forming process. As a result, the bending of a glass sheet in the short side direction that has been difficult in bending in terms of structure can be enhanced, forming the glass sheet in a desired bent shape in both short side and long side direction. In addition, since the degree to which a glass sheet has a central region sagged by its own weight can be increased by spending sufficient time for the first forming process, the glass sheet can be prepared so as to provide the central region with a greatly bent shape.

What is claimed is:

1. A method for bending a glass sheet, which comprises putting an unformed glass sheet on a ring mold to support peripheral portions of the unformed glass sheet thereon, and carrying the ring mold into a heating furnace to bend the glass sheet; and which further comprises a first forming process to heat the unformed glass to a bending temperature to bend the unformed glass sheet so as to form the unformed glass sheet into an intermediate glass sheet, and a second forming process to support the peripheral portions of the intermediate glass on a forming surface conformed with a final shape of the glass sheet to be formed and to form the intermediate glass sheet into a glass sheet having a certain bent shape along the forming surfaces; wherein the intermediate glass sheet is formed by bending portions of the unformed glass sheet in a short side direction in the first forming process, and the portions of the intermediate glass sheet in the short direction are further bent so as to provide a certain bent surface and portions of the intermediate glass sheet in a long side direction is bent.

2. The method for bending a glass sheet according to claim 1, wherein as the ring mold is used a ring mold which comprises a first forming frame for bending the unformed glass sheet to form the unformed glass sheet into the intermediate glass sheet, and a second forming frame for supporting the peripheral portions of the intermediate glass sheet on a forming surface conformed with a final shape of the glass sheet to be formed and for forming the intermediate glass sheet into a glass sheet along the forming surface having a certain bent shape so as to have a certain bent shape, wherein as the first forming frame is used a forming frame which has substantially flat sides for supporting long sides of the glass sheet and sides for supporting short sides of the glass sheet curved in an upward concave shape, and wherein as the second forming frame is used a forming frame which comprises fixed frames fixedly provided, and swingable frames provided on both sides of the fixed frames in a longitudinal direction and apart from the fixed frames, and each of the swingable frames is turnable about an intermediate position as a swingable center which is located apart from a separating position with the related fixed frame.

3. The method for bending a glass sheet according to claim 2, wherein at least one of the first forming frame and the second forming frame is lifted or lowered to transfer the intermediate glass on the first frame onto the second forming frame between the first forming process and the second forming process.

4. The method for bending a glass sheet according to claim 1, wherein the intermediate glass sheet is formed by bending portions of the unformed glass sheet only in a short side direction in the first bending process.

5. The method for bending a glass sheet according to claim 1, wherein said ring mold comprises a first closed annular forming frame for bending the unformed glass sheet, to form the unformed glass sheet into the intermediate glass sheet, and a second forming frame for supporting the peripheral portions of the intermediate glass sheet on a forming surface conformed with a final shape of the glass sheet to be formed and for forming the intermediate glass sheet into a glass sheet along the forming surface having a certain bent shape so as to have a certain bent shape, wherein the first closed annular forming frame has substantially flat sides for supporting long sides of the glass sheet, and sides for supporting short sides of the glass sheet curved in an upward concave shape, and wherein the second forming frame comprises fixed frames and swingable frames provided on both sides of the fixed frames in a longitudinal direction an apart from the fixed frames, and each of the swingable frames is turnable about an intermediate position as a swingable center which is located apart from a separating position with the related fixed frame.

6. The method for bending a glass sheet according to claim 5, wherein at least one of the first closed annular forming frame and the second forming frame is lifted or lowered to transfer the intermediate glass on the first closed annular forming frame onto the second forming frame between the first forming process and the second forming process.

7. The method for bending a glass sheet according to claim 5, wherein the intermediate glass sheet is formed by bending portions of the unformed glass sheet only in a short side direction in the first bending process.

8. The method for bending a glass sheet according to claim 6, wherein the intermediate glass sheet is formed by bending portions of the unformed glass sheet only in a short side direction in the first bending process.

9. A ring mold for bending a glass sheet, which supports peripheral portions of an unformed glass sheet, and is carried into a heating furnace, carrying the unformed glass sheet thereon, to bend the glass sheet, and which comprises a first closed annular forming frame configured for bending only short sides of the unformed glass sheet to form the unformed glass sheet into an intermediate glass sheet having bent short sides when the unformed glass sheet is heated to a bending temperature, and a second forming frame for supporting peripheral portions of the intermediate glass formed by the first forming frame on a forming surface conformed with a final shape of the glass sheet and for forming the intermediate glass sheet into the final glass sheet along the forming surface, wherein the second forming frame comprises fixed frames fixedly provided, and swingable frames provided on both sides of the fixed frames in a longitudinal direction and apart from the fixed frames, and that each of the swingable frames is turnable about an intermediate position as a swingable center which is located apart from a separating position with the related fixed frame.

10. The ring mold for a glass sheet according to claim 9, wherein at least one of the first forming frame and the second forming frame can be lifted or lowered, the first forming frame and the second forming frame are relatively moved to transfer the intermediate glass sheet on the first frame onto the second forming.

11. The ring mold for a glass sheet according to claim 9, wherein the first forming frame has substantially flat sides for supporting long sides of the glass sheet and curved sides for supporting said bent short sides of the glass sheet curved in an upward concave shape.

12. The ring mold for a glass sheet according to claim 10, wherein the first forming frame has substantially flat sides for supporting long sides of the glass sheet and curved sides for supporting said bent short sides of the glass sheet curved in an upward concave shape.

13. An apparatus for bending a glass sheet, which comprises a heating furnace for heating an unformed glass sheet to a bending temperature, and a ring mold to be carried into the heating furnace, supporting peripheral portions of the unformed glass sheet thereon and to sag the unformed glass sheet due to its own weight caused by softening of the glass sheet, wherein the ring mold supports peripheral portions of an unformed glass sheet, and is carried into a heating furnace, carrying the unformed glass sheet thereon, to bend the glass sheet, and which comprises a first closed annular forming frame configured for bending only short sides of the unformed glass sheet to form the unformed glass sheet into an intermediate glass sheet having bent short sides when the unformed glass sheet is heated to a bending temperature, and a second forming frame for supporting peripheral portions of the intermediate glass formed by the first forming frame on a forming surface conformed with a final shape of the glass sheet and for forming the intermediate glass sheet into the final glass sheet along the forming surface, wherein the second forming frame comprises fixed frames fixedly provided, and swingable frames provided on both sides of the fixed frames in a longitudinal direction and apart from the fixed frames, and that each of the swingable frames is turnable about an intermediate position as a swingable center which is located apart from a separating position with the related fixed frame.

14. An apparatus for bending a glass sheet, which comprises a heating furnace for heating an unformed glass sheet to a bending temperature, and a ring mold to be carried into the heating furnace, supporting peripheral portions of the unformed glass sheet thereon and to sag the unformed glass sheet due to its own weight caused by softening of the glass sheet, wherein the ring mold supports peripheral portions of an unformed glass sheet, and is carried into a heating furnace, carrying the unformed glass sheet thereon, to bend the glass sheet, and which comprises a first closed annular forming frame configured for bending only short sides of the unformed glass sheet to form the unformed glass sheet into an intermediate glass sheet having bent short sides when the unformed glass sheet is heated to a bending temperature, and a second forming frame for supporting peripheral portions of the intermediate glass formed by the first forming frame on a forming surface conformed with a final shape of the glass sheet and for forming the intermediate glass sheet into the final glass sheet along the forming surface, wherein the second forming frame comprises fixed frames fixedly provided, and swingable frames provided on both sides of the fixed frames in a longitudinal direction and apart from the fixed frames, and that each of the swingable frames is turnable about an intermediate position as a swingable center which is located apart from a separating position with the related fixed frame, and wherein at least one of the first forming frame and the second forming frame can be lifted or lowered, the first forming frame and the second forming frame are relatively moved to transfer the intermediate glass sheet on the first frame onto the second frame.

15. An apparatus for bending a glass sheet, which comprises a heating furnace for heating an unformed glass sheet to a bending temperature, and a ring mold to be carried into the heating furnace, supporting peripheral portions of the unformed glass sheet thereon and to sag the unformed glass sheet due to its own weight caused by softening of the glass sheet, wherein the ring mold supports peripheral portions of an unformed glass sheet, and is carried into a heating furnace, carrying the unformed glass sheet thereon, to bend the glass sheet, and which comprises a first closed annular forming frame configured for bending only short sides of the unformed glass sheet to form the unformed glass sheet into an intermediate glass sheet having bent short sides when the unformed glass sheet is heated to a bending temperature, and a second forming frame for supporting peripheral portions of the intermediate glass formed by the first forming frame on a forming surface conformed with a final shape of the glass sheet and for forming the intermediate glass sheet into the final glass sheet along the forming surface, wherein the second forming frame comprises fixed frames fixedly provided, and swingable frames provided on both sides of the fixed frames in a longitudinal direction and apart from the fixed frames, and that each of the swingable frames is turnable about an intermediate position as a swingable center which is located apart from a separating position with the related fixed frame, wherein the first forming frame has substantially flat sides for supporting long sides of the glass sheet and curved sides for supporting said bent short sides of the glass sheet curved in an upward concave shape.

16. An apparatus for bending a glass sheet, which comprises a heating furnace for heating an unformed glass sheet to a bending temperature, and a ring mold to be carried into the heating furnace, supporting peripheral portions of the unformed glass sheet thereon and to sag the unformed glass sheet due to its own weight caused by softening of the glass sheet, wherein the ring mold supports peripheral portions of an unformed glass sheet, and is carried into a heating furnace, carrying the unformed glass sheet thereon, to bend the glass sheet, and which comprises a first closed annular forming frame configured for bending only short sides of the unformed glass sheet to form the unformed glass sheet into an intermediate glass sheet having bent short sides when the unformed glass sheet is heated to a bending temperature, and a second forming frame for supporting peripheral portions of the intermediate glass formed by the first forming frame on a forming surface conformed with a final shape of the glass sheet and for forming the intermediate glass sheet into the final glass sheet along the forming surface, wherein the second forming frame comprises fixed frames fixedly provided, and swingable frames provided on both sides of the fixed frames in a longitudinal direction and apart from the fixed frames, and that each of the swingable frames is turnable about an intermediate position as a swingable center which is located apart from a separating position with the related fixed frame, wherein at least one of the first forming frame and the second forming frame can be lifted or lowered, the first forming frame and the second forming frame are relatively moved to transfer the intermediate glass sheet on the first frame onto the second forming, and wherein the first forming frame has substantially flat sides for supporting long sides of the glass sheet and sides for supporting said bent short sides of the glass sheet curved in an upward concave shape.

* * * * *